United States Patent
Yamaura et al.

(10) Patent No.: US 6,824,912 B2
(45) Date of Patent: Nov. 30, 2004

(54) FUEL CELL AND METHOD FOR PREPARATION THEREOF

(75) Inventors: Kiyoshi Yamaura, Kanagawa (JP); Minehisa Imazato, Tokyo (JP)

(73) Assignee: Sony Corporation, Tokyo (JP)

( * ) Notice: Subject to any disclaimer, the term of this patent is extended or adjusted under 35 U.S.C. 154(b) by 524 days.

(21) Appl. No.: 09/967,309

(22) Filed: Sep. 28, 2001

(65) Prior Publication Data

US 2002/0048702 A1 Apr. 25, 2002

(30) Foreign Application Priority Data

Sep. 29, 2000 (JP) ..................................... P2000-301408

(51) Int. Cl.[7] .............................................. H01M 4/86
(52) U.S. Cl. ............................. 429/41; 429/40; 429/44; 429/30; 429/33; 29/623.1; 29/623.3; 29/623.4; 29/623.5; 29/730
(58) Field of Search ............................. 429/40, 41, 44, 429/30, 33; 29/623.1, 623.3, 623.4, 623.5, 730

(56) References Cited

U.S. PATENT DOCUMENTS

| | | | |
|---|---|---|---|
| 5,470,680 A | 11/1995 | Loutfy et al. | 429/218 |
| 6,495,290 B1 * | 12/2002 | Hinokuma et al. | 429/231.8 |
| 6,613,464 B1 * | 9/2003 | Wilkinson et al. | 429/13 |
| 6,726,963 B2 * | 4/2004 | Yamaura | 427/540 |
| 2002/0006539 A1 | 1/2002 | Kubota et al. | 429/44 |

FOREIGN PATENT DOCUMENTS

| | | |
|---|---|---|
| JP | 3-167712 | 7/1991 |
| JP | 7-130372 | 5/1995 |
| JP | 7-326363 | 12/1995 |
| JP | 8-88008 | 4/1996 |
| JP | 10-189002 | 7/1998 |
| JP | 2000-228204 | 8/2000 |

OTHER PUBLICATIONS

Che et al., Carbon Nanotubule Membranes for Electrochemical Energy Storage and Production, NATURE, pp. 346–349, May 1998.

* cited by examiner

Primary Examiner—Bruce F. Bell
(74) Attorney, Agent, or Firm—Bell, Boyd & Lloyd LLC

(57) ABSTRACT

A fuel cell in which optimum proton conductivity is maintained even in a dry atmosphere and in which the output is not lowered is provided. The fuel cell of the present invention includes a fuel electrode, an oxygen electrode and a proton conductor film disposed therebetween. The fuel electrode and the oxygen electrode are formed of powders of a carbonaceous material as an electrode material. A proton conductor composed of a carbonaceous material mainly composed of carbon and proton dissociative groups introduced into the carbonaceous material is present on the surfaces of the fuel and/or oxygen electrodes. The proton conductor can exhibit optimum proton conductivity without humidification.

11 Claims, 9 Drawing Sheets

FUEL CELL AND METHOD FOR PREPARATION THEREOF

RELATED APPLICATION DATA

The present application claims priority to Japanese Patent Document No. P2000-301408 filed on Sep. 29, 2000 which is hereby incorporated by reference to the extent permitted by law.

BACKGROUND OF THE INVENTION

The present invention relates to a fuel cell for producing an electromotive force by reaction of a fuel, such as hydrogen, with oxygen. This invention also relates to a method for the preparation of the fuel cell.

A continuing need exists for an alternative energy source which may take the place of, for example, a fossil fuel, such as petroleum. For example, a hydrogen gas fuel is a desirable alternative and clean energy source. In this regard, hydrogen has a large amount of energy contained per unit weight and, in use, does not emit noxious gases or gases contributing to global warming. Thus, hydrogen is regarded to be an ideal energy source which is clean and, moreover, plentiful in supply.

In particular, fuel cells are generally known to be developed which are capable of recovering electrical energy from energy derived from a hydrogen fuel source. It is generally expected that such fuel cells may be applied in a number of applications, such as, in large scale power generation, on-site self-generation of power or as a power source for an electric vehicle.

The fuel cell typically includes a fuel electrode, such as a hydrogen electrode, and an oxygen electrode, arranged on both sides of a proton conductor film. By supplying fuel (hydrogen) and oxygen to these electrodes, a cell reaction occurs which is utilized to develop an electromotive force. In preparing the fuel cell, the proton conductor film, fuel electrode and the oxygen electrode are routinely molded separately and bonded together.

It is generally accepted that the ability of the fuel cell to facilitate and promote proton conduction during the cell reaction plays an important role in the performance of the fuel cell.

However, typically used proton conductor materials, including a polymer material capable of conducting protons (hydrogen ions), such as perfluorocosulfonic acid resin, generally require to be humidified in order to maintain satisfactory protonic conductivity. In this regard, proton conductivity necessary for a desirable fuel cell performance cannot be maintained in a dry atmosphere using such materials.

Further, the aforementioned polymer material can perform unsatisfactorily with respect to electronic conductivity. This is important because, in the fuel cell, not only protons but also electrons need to be migrated or conducted promptly between and within the terminals. In this regard, the polymer material discussed above is poor in electronic conductivity such that the internal resistance tends to be increased.

SUMMARY OF THE INVENTION

It is therefore an advantage of the present invention to provide a fuel cell capable of maintaining optimum proton conductivity even in a dry atmosphere without lowering output of the fuel cell, and a method for the preparation for such a fuel cell.

In an embodiment, the present invention provides a fuel cell having a fuel electrode and an oxygen electrode arranged facing each other with a proton conductor film or film layer disposed therebetween, wherein the fuel electrode and/or the oxygen electrode includes powders of a carbonaceous material as an electrode material such that on the surfaces of said fuel electrode and the oxygen electrode a proton conductor including a carbon-based material mainly composed of carbon and proton dissociative groups introduced in the carbon-based material is provided.

In another embodiment, the present invention provides a method for the preparation of a fuel cell including adding powders of a carbonaceous material as a material for a fuel electrode and/or an oxygen electrode into a solvent containing a proton conductor material including a carbon-based material substantially composed of carbon and a number of proton dissociative groups introduced into the carbon-based material, coating the surfaces of the powder of a carbonaceous material with the proton conductor, and forming at least one of a fuel electrode and an oxygen electrode of the fuel cell.

It should be noted that "proton dissociative groups" means a number of functional groups from which protons ($H_+$) can be detached due to electrical dissociation.

In an embodiment, the proton conductor composed of the carbonaceous or carbon-based material (such as, carbon clusters, e.g., fullerene or carbon nano-tubes) mainly composed of carbon and proton dissociative groups introduced into the carbonaceous material can exhibit optimal and desirably optimum proton conductivity without humidification.

Thus, if such a proton conductor material is additionally present on the surface of the powder of a carbonaceous material as the electrode material, proton conductivity can be sufficiently maintained even in a dry atmosphere.

In addition, since the electrode material coated with the proton conductor is a carbonaceous material, optimum electronic conductivity is provided simultaneously.

According to the present invention, since optimum proton conductivity can be maintained even in a dry atmosphere, optimum proton conductivity may be maintained to provide a fuel cell in which output lowering may be effectively prevented from occurring.

Additional features and advantages of the present invention are described in, and will be apparent from, the Detailed Description of the Invention and the Figures.

DETAILED DESCRIPTION OF THE INVENTION

Referring to the drawings, a fuel cell and a method for the preparation thereof, according to the present invention, will be explained in detail.

Figure 1:
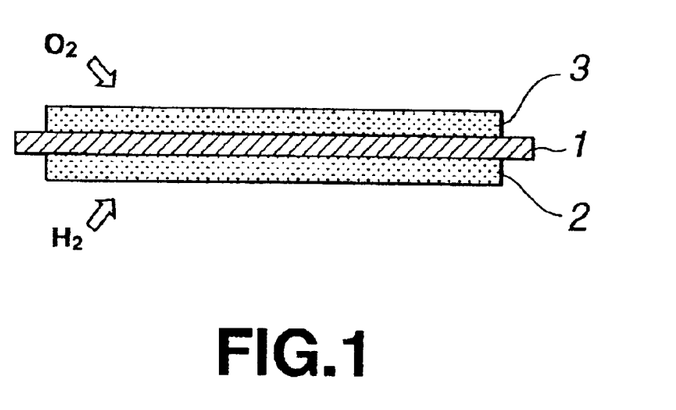
FIG. 1 is a schematic cross-sectional view showing a fuel cell according to an embodiment of the present invention.

In an embodiment, the structure of the fuel cell includes a proton conductor film or film layer 1 exhibiting proton conductivity and a fuel electrode 2 and an oxygen electrode 3 formed on respective surfaces of the proton conductor film 1 as shown in FIG. 1.

If hydrogen, for example, is supplied to the fuel electrode 2, and oxygen is supplied to the oxygen electrode 3, a cell reaction occurs to produce an electromotive force. In the case of a direct methanol system, methanol may also be supplied as a hydrogen source to the fuel electrode 2.

Figure 2:
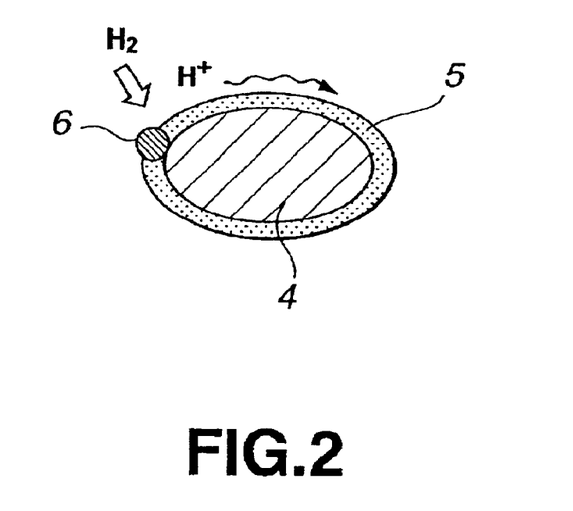
FIG. 2 is a schematic view showing the powders of a carbonaceous material coated by a proton conductor according to an embodiment of the present invention.

In an embodiment, the fuel electrode 2 and the oxygen electrode 3 are formed by powders of a carbonaceous material or carbon-based material, as an electrode material, and can be prepared by molding or any suitable manner. According to the present invention, the surface of the powder of a carbonaceous material 4 is coated with a proton conductor material 5, as shown in FIG. 2. Applicants have uniquely discovered that the addition of the proton conductor material can facilitate the proton conduction characteristics of the fuel cell.

If the fuel electrode 2 is configured as indicated above, and the fuel supplied is hydrogen, it is converted into a proton and an electron. This conversion process can be facilitated with the incorporation of a catalyst 6 having a metal component within the fuel electrode as shown in FIG. 2. In this regard, the proton is migrated through the proton conductor 5 of the fuel electrode towards the proton conductor film 1. On the other hand, the electron is caused to flow towards a terminal based on the electron conductivity of the powder of a carbonaceous material 4 forming a matrix of the electrode 2.

For coating the surface of the powder of a carbonaceous material 4 with the proton conductor 5, in an embodiment, the proton conductor can be dispersed in or added to a solvent wherein the powder of a carbonaceous material is dipped therein or added thereto in any suitable fashion and subsequently dried.

In an embodiment, the proton conducting material that forms the proton conductor 5 includes a carbonaceous material composed mainly of carbon and forming a matrix structure wherein one or more proton dissociative groups are introduced therein. The proton dissociative groups include, for example, —OH, —OSO$_3$H, —SO$_3$H, —SO$_3$H, —COOH, —OPO(OH)$_2$, mixtures thereof and the like. In this regard, protons can be migrated through the proton dissociative groups to facilitate ion conductivity.

The carbonaceous material of the proton conductor can include any suitable material such as a material composed of carbon. It is however necessary for the ion conductivity of the material to be higher than the electronic conductivity after introducing the proton dissociative groups. In an embodiment, a carbon cluster, as an aggregate of carbon atoms, or tubular carbon materials (such as, carbon nano-tubes), mixtures thereof and the like, may be used as the carbonaceous material.

In an embodiment, a variety of carbon clusters, fullerene, a fullerene structure having an opening end at least at a portion thereof, or a diamond structure, is preferred as discussed in detail below.

A cluster means an aggregate of several to hundreds of atoms, bound, flocculated or otherwise held together. If these atoms are carbon atoms, such flocculation or aggregation improves proton conductivity while simultaneously maintaining chemical properties to provide for sufficient film strength and for ease in forming layers. A 'cluster mainly composed of carbon' means an aggregate of several to hundreds of carbon atoms regardless of the type of the carbon-carbon bonds. Such cluster may, however, not be composed only of carbon atoms, such that other atoms may be present together with the carbon atoms. Thus, in order to encompass such case, an aggregate, the major portion of which is composed of carbon atoms, is termed a carbon cluster. Examples of these aggregates are shown in FIGS. 3 to 6 in which the proton dissociative groups are omitted. It should be appreciated that a variety of different and suitable types of proton conducting materials can be utilized.

Figure 3:
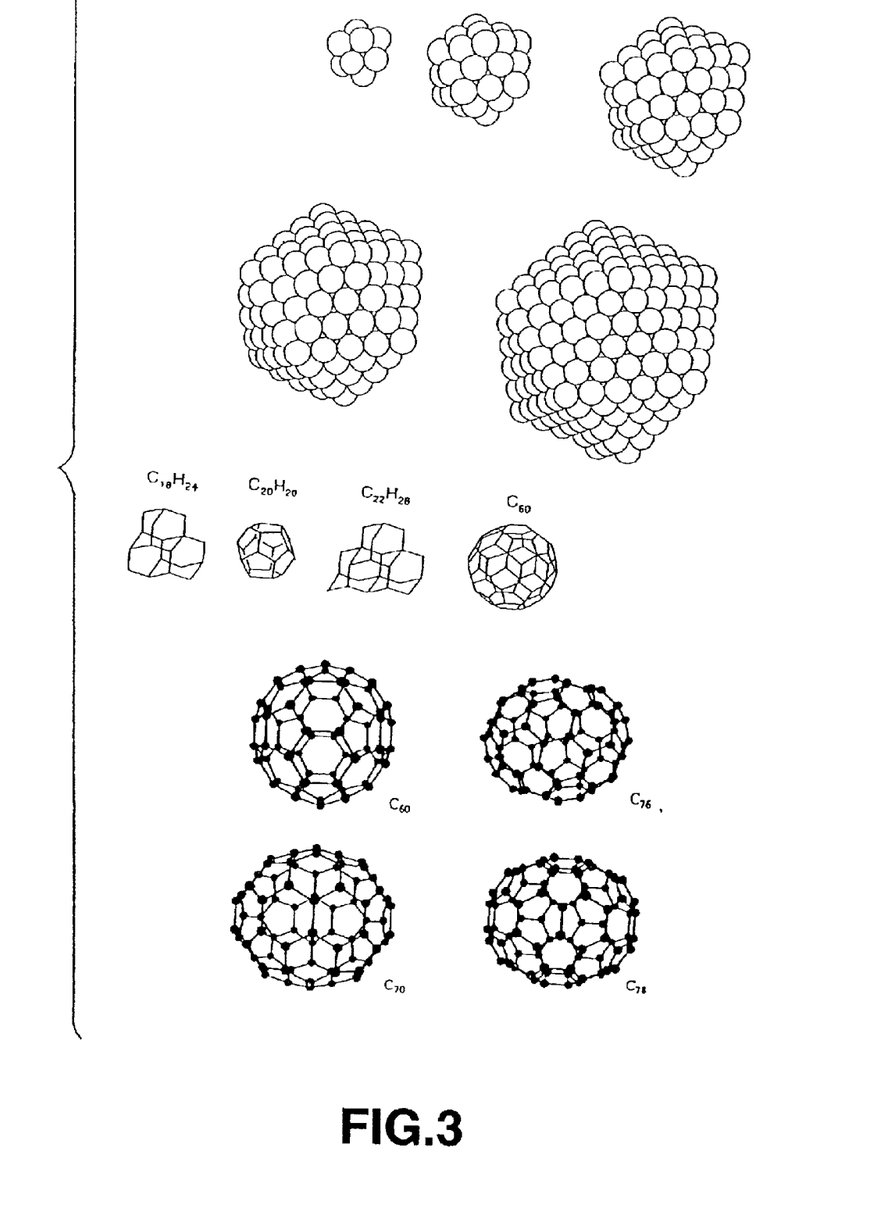
FIG. 3 is a schematic view showing various examples of a carbon cluster according to an embodiment of the present invention.
Figure 4:
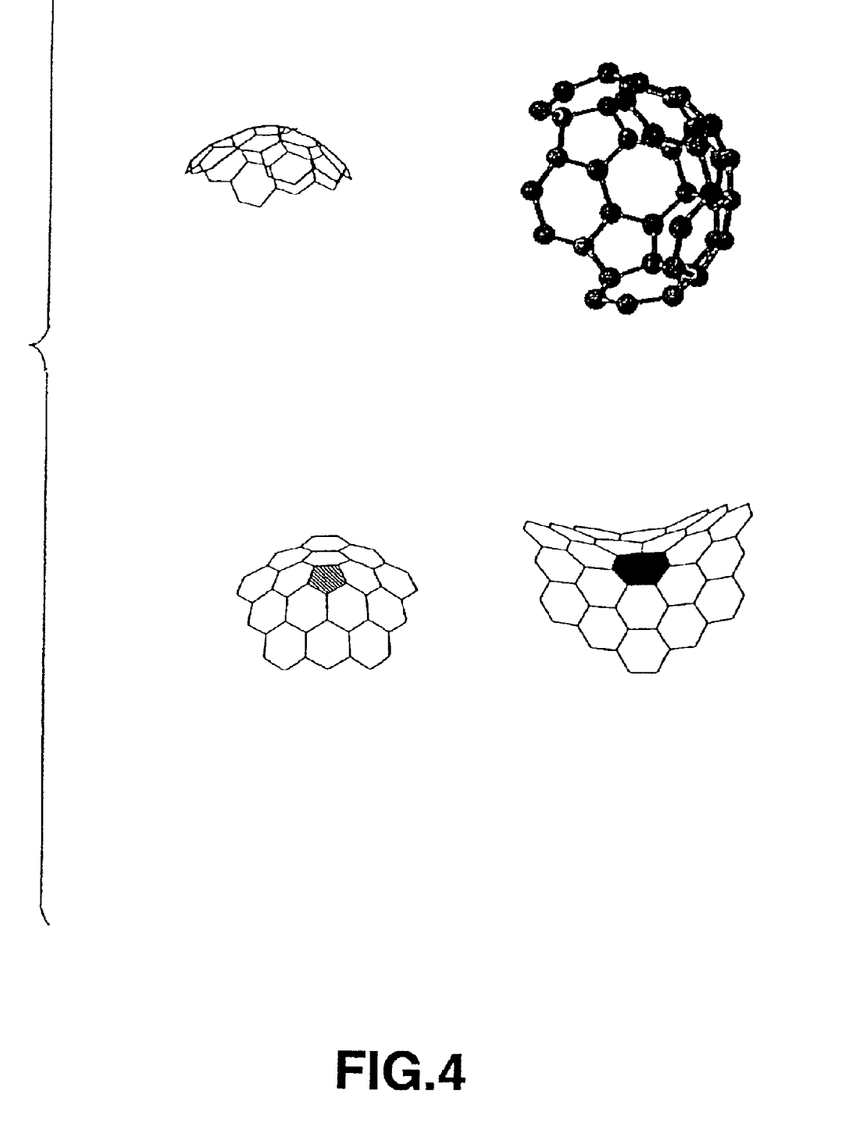
FIG. 4 is a schematic view showing another example of a carbon cluster (e.g., a partial fullerene structure) according to an embodiment of the present invention.
Figure 5:
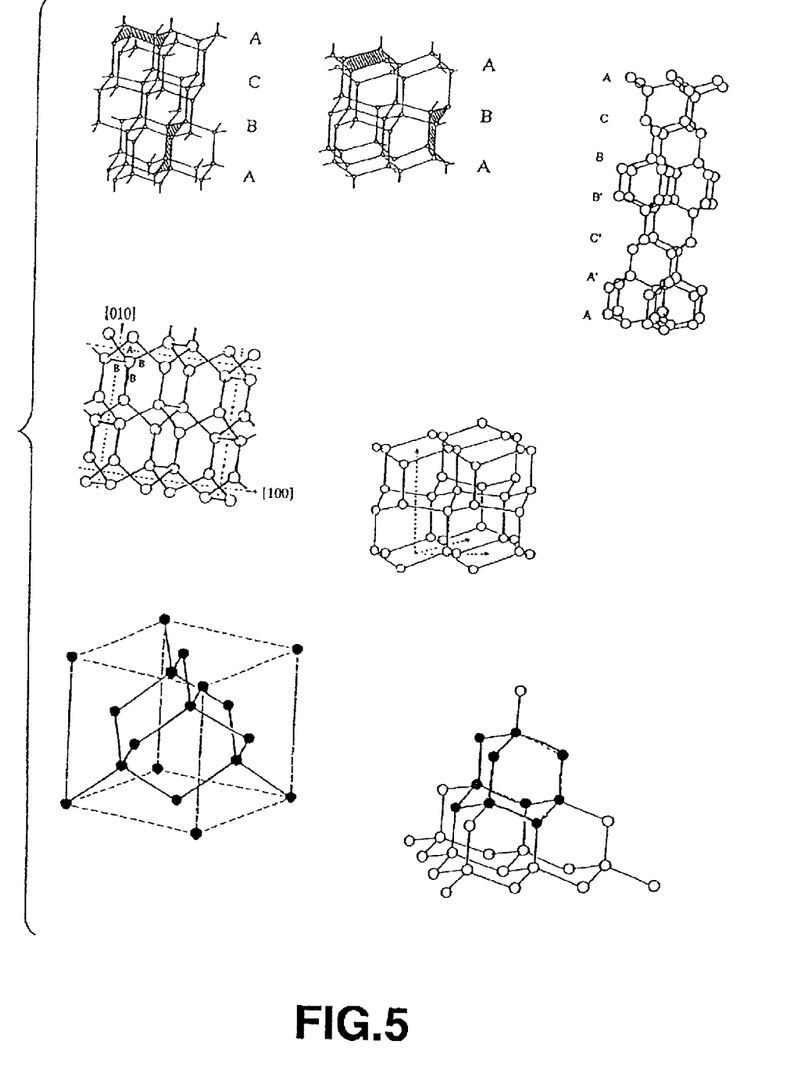
FIG. 5 is a schematic view showing still another example of a carbon cluster (e.g., a diamond structure) according to an embodiment of the present invention.

FIG. 3 shows a variety of carbon clusters, each composed of a large number of carbon atoms and each having the structure of a closed surface similar to that of a sphere, an elongated ball and the like. In FIG. 3, molecular fullerenes are also shown. FIG. 4 shows a variety of carbon clusters wherein the spherical structures are partially interrupted. These types of the carbon clusters feature open ends in the structures. A large number of such structures may be seen as by-products in the process of the fullerene manufacturing process by arc discharge. If the major portion of the carbon atoms of the carbon cluster are bound in an SP$^3$ bond, a diamond structure is produced, such as is shown in the structure of the various clusters shown in FIG. 5.

Figure 6:
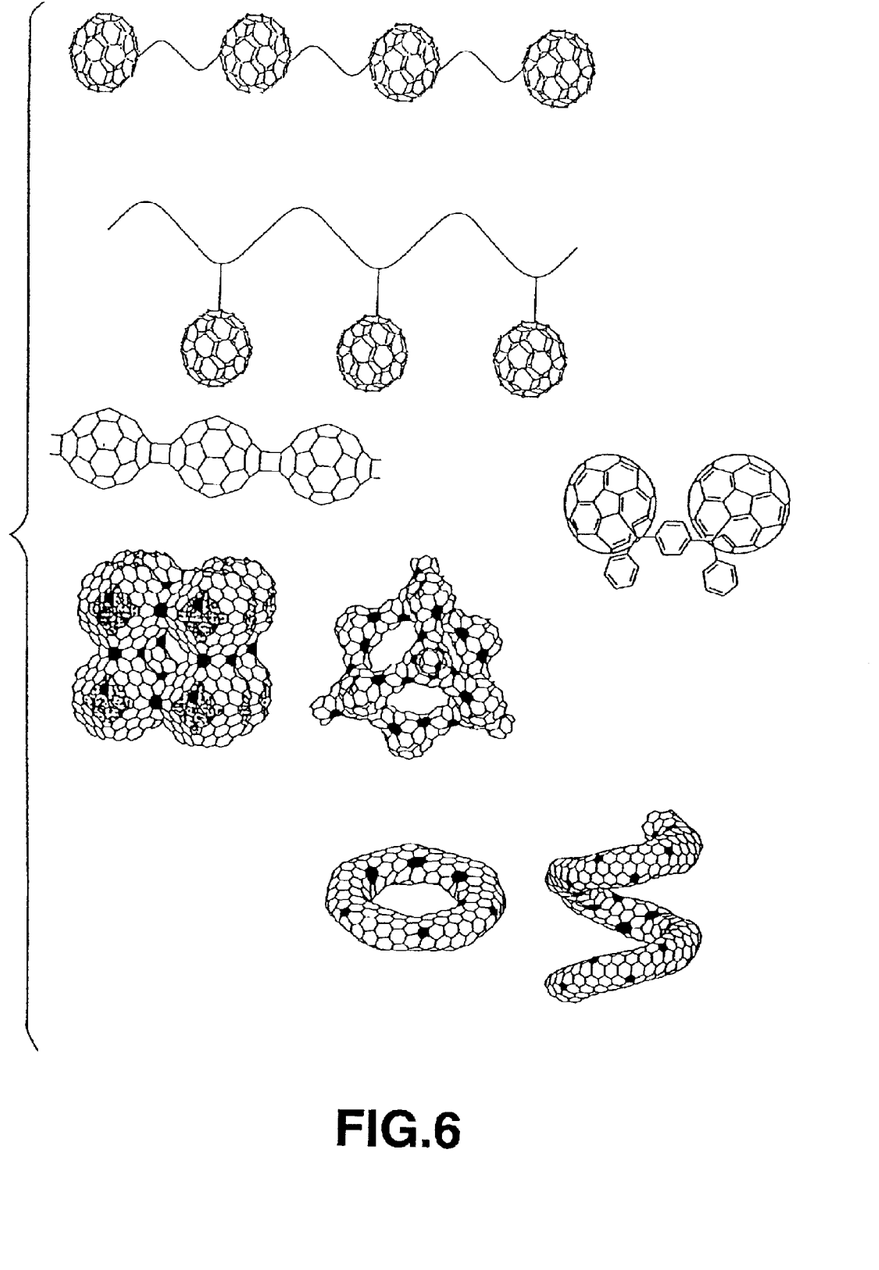
FIG. 6 is a schematic view showing yet another example of a carbon cluster (e.g., carbon clusters bonded together) according to an embodiment of the present invention.

FIG. 6 shows several examples in each of which different clusters are bound together. It should be appreciated that the carbon-based materials and structures thereof and other like materials can be utilized in the present invention in any suitable way.

In the proton conductor of the present invention protons can be dissociated even under dry conditions, due to, for example, the dissociative groups of the carbonaceous material. Moreover, these protons are able to exhibit high conductivity over a wide temperature range including the ambient temperature, such as a temperature ranging from at least about 160° C. to about −40° C. Although the proton conductor of the present invention exhibits sufficient proton conductivity even under dry condition, the presence of moisture may be tolerated. Such moisture may be due to, for example, environmental conditions.

Although any suitable carbonaceous material may be used as the powder of a carbonaceous material 4 which is used as an electrode material, it is particularly desirable that needle-like carbonaceous materials, or fibrous carbonaceous materials (i.e., carbonaceous materials composed of fibers including carbon fibers), for example, carbon nanotubes, needle-like graphite (i.e., graphite fibrous material), such as vapor-grown carbon fibers (VGCF) manufactured by TOHO RAYON CO., LTD., like materials or mixtures thereof, are contained in the powder of a carbonaceous material 4.

Figure 7:
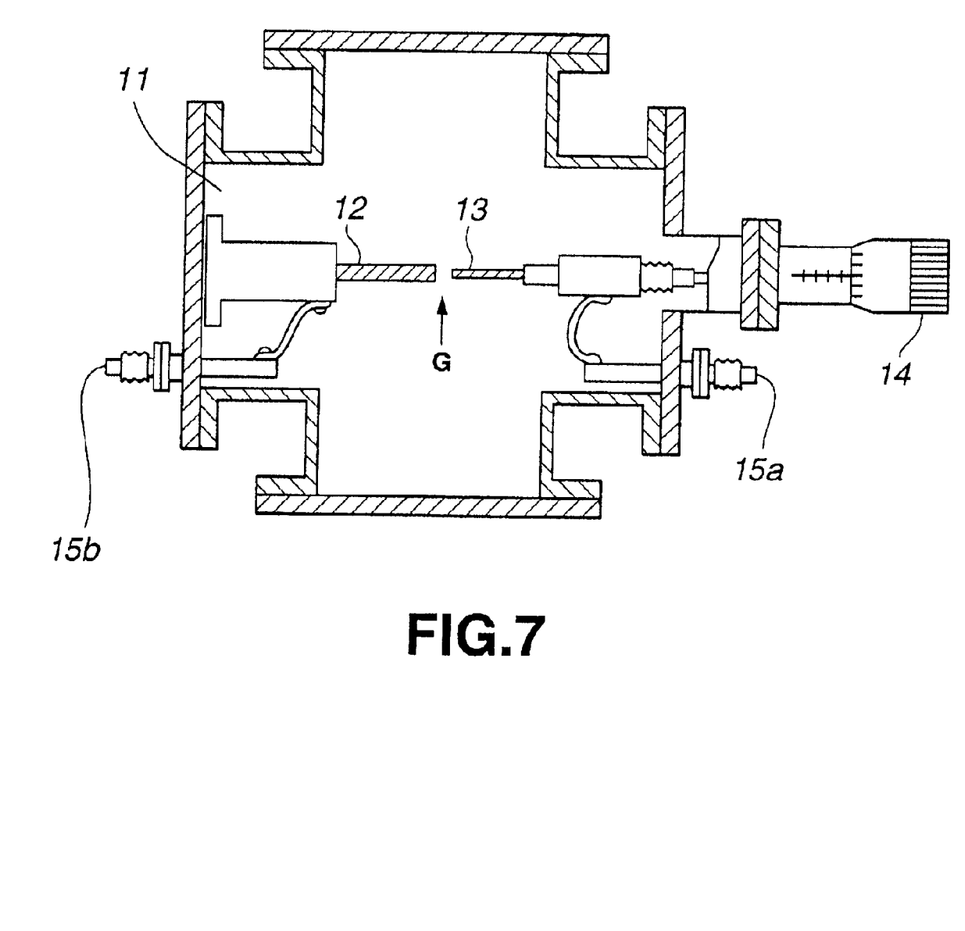
FIG. 7 is a schematic view showing an arc discharge device used for the preparation of a carbon nano-tube according to an embodiment of the present invention.

FIG. 7 schematically illustrates an arc discharge device used for the preparation of a carbonaceous material including carbon nano-tubes. In an embodiment of the present invention, the fuel cell includes a negative electrode 12 and a positive electrode 13, both made up of, for example, a rod of carbon, such as graphite. As shown in FIG. 7, they are arranged facing each other with a gap G in-between within a reaction chamber 11, such as a vacuum chamber. An end of the positive electrode 13 is connected to a device 14 that provides linear movement. The electrodes 12, 13 are connected to current introducing terminals 15a and 15b, respectively.

In the above arrangement in an embodiment, the inside of the reaction chamber 11 can be evacuated and subsequently charged with rare gases, such as helium. The DC current is supplied to the respective electrodes and an arc discharge is produced across the negative electrode 12 and the positive electrode 13. Thus, a soot-like carbonaceous material is deposited on the inner surface of the reaction chamber 11, that is on the sidewall surface, ceiling surface, bottom surface, the like or combinations thereof and on the negative electrode 12. In an embodiment, a small-sized vessel can be attached to, for example, the sidewall surface or other surface of the reaction chamber 11. In this regard, the soot can be deposited therein.

Figure 8A:
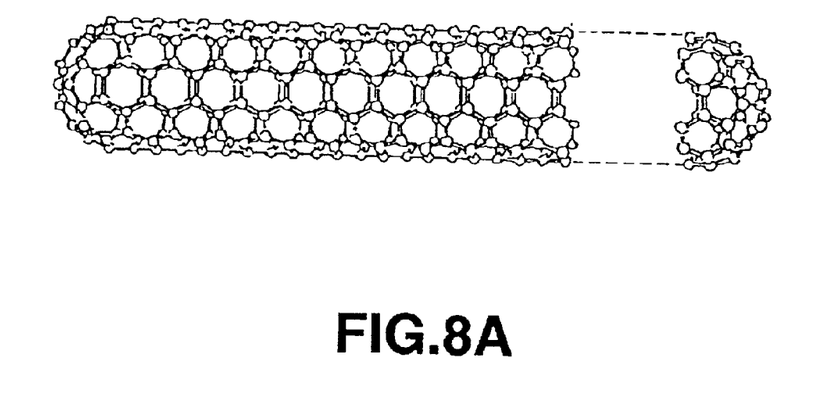
FIGS. 8a to 8c are schematic views showing a variety of carbonaceous materials contained in a carbon soot prepared during arc discharge according to an embodiment of the present invention.
Figure 8B:
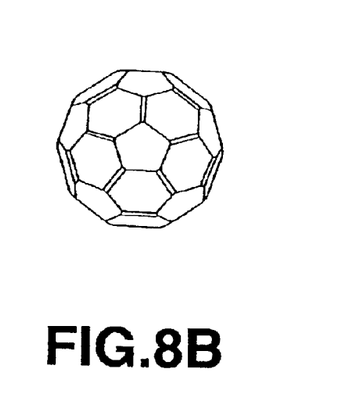
Figure 8C:
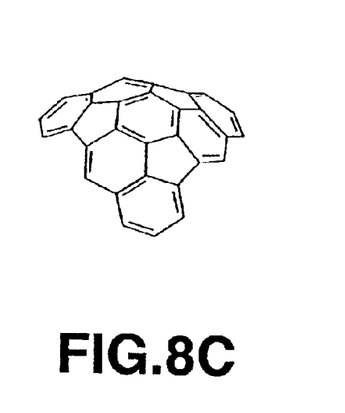

In an embodiment, the soot-like carbonaceous material recovered from the reaction chamber 11 include material such as, carbon nano-tubes as shown in FIG. 8A; $C_{60}$ fullerene as shown in FIG. 8B; $C_{70}$ fullerene (not shown); and carbon soots as shown in FIG. 8C. The carbon soots are carbon-based materials having a curvature which obstructs the growth of the carbon soot material to form fullerene molecules or carbon nano-tubes. In an embodiment, the carbonaceous material recovered from arc discharge may be made up of fullerene, including $C_{60}$ or $C_{70}$ carbon nano-tubes, carbon soot and combinations thereof. In an embodiment, the carbonaceous material includes 10% to 20% of fullerenes by weight, a few percent of carbon nano-tubes by weight with the remaining balance being carbon soot.

In the above-described carbonaceous material, an embodiment, 20 wt % or less of a metal having a catalytic capability to separate a hydrogen molecule into a hydrogen atom and further to a proton and to an electron may preferably be provided by any suitable known method, on at least the surface of the carbonaceous material. In an embodiment, the metal exhibiting such a catalytic action can include platinum, platinum alloys, the like and mixtures thereof. It should be appreciated that the addition of a catalytic metal can increase the efficiency and performance of the cell reaction.

In an embodiment, the above-mentioned needle-like carbonaceous material fibrous carbonaceous material or the like used for the fuel electrode 2 and/or the oxygen electrode 3 may be formed directly on the proton conductor film 1 by, for example, a spraying method or by a dripping method. In the case of the spraying method, the carbonaceous material of the present invention is dispersed in water or in a solvent, such as ethanol, and directly sprayed onto the proton conductor film 1. In the case of the dripping method, the carbonaceous material can be similarly dispersed in water or in a solvent, such as ethanol, and directly dripped onto the proton conductor film 1. Any other suitable methods to apply the electrodes to the proton conductor film can be utilized.

This produces an agglomeration of the carbonaceous material on the proton conductor film 1. In an embodiment, the carbonaceous material, for example, composed of carbon nano-tubes is in the form of elongated fibers each approximately 1 nm in diameter and ranging from about 1 to about 10 $\mu$m in length, or composed of needle-like graphite in the form of needles or very fine fibers each of about 0.1 to about 0.5 $\mu$m in diameter and about 1 to about 50 $\mu$m in length. In this regard, the carbon nano-tubes and the needle-like graphite are entangled together to form an optimum layered product without the necessity of using a binder. Of course, a binder may also be used as necessary.

The fuel electrode 2 and the oxygen electrode 3, formed as described above, need not be independent films, and hence are not required to exhibit mechanical strength and may be of an extremely thin thickness of, for example, about 10 $\mu$m or less, such as on the order of 2 to 4 $\mu$m.

In the above-described fuel cell, any suitable material exhibiting protonic conductivity may be used as the proton conductor film 1. For example, a proton conducting material may be coated on and carried by a separator for use as the proton conductor film 1.

Specifically, the materials usable as the proton conductor film 1 can include a polymer material capable of conducting protons (hydrogen ions), such as perfluorosulfonic acid resin, for example, Nafion(R) manufactured by Du Pont SA, like materials and combinations thereof. For example, polymolybdenic acids or oxides having a large number of hydrates, such as $H_3Mo_{12}PO_{40}29H_2O$ or $Sb_2O_5$ 5.4$H_2O$, may be used. Under wet conditions, these polymer materials exhibit high proton conductivity at or near ambient temperature.

With respect to the perfluorosulfonic acid resin, as an example, protons electrically dissociated from the sulfonic acid group are bound with the moisture taken in large quantities into the high molecular weight matrix by a hydrogen bond to generate protonated water, that is oxonium ions ($H_3O^+$), such that protons can be smoothly migrated in the high molecular weight matrix in the form of these oxonium ions. In this regard, this type of proton conductor matrix material can exhibit appreciably high proton conductivity even at or near ambient temperature.

It should be appreciated that a proton conductor having a number of different and suitable conduction mechanisms can be utilized based on materials different than what have been previously discussed.

For example, alternative materials can include composite metal oxides having a perovskite structure, such as Yb-doped $SrCeO_3$. These composite metal oxides having a perovskite structure have been found to exhibit protonic conductivity without relying on moisture as the medium for movement. In these composite metal oxides, the protons are understood to be conducted by channeling by themselves through oxygen ions forming the skeleton of the perovskite structure.

However, the necessity for humidification presents itself even with this type of material used for the proton conductor film. It is therefore desirable to use a material similar to, substantially similar to identical to, or combinations thereof to the proton conductor material as previously discussed, such as a proton conductor having a carbonaceous material composed mainly of carbon and having proton dissociative groups introduced therein.

Figure 9:
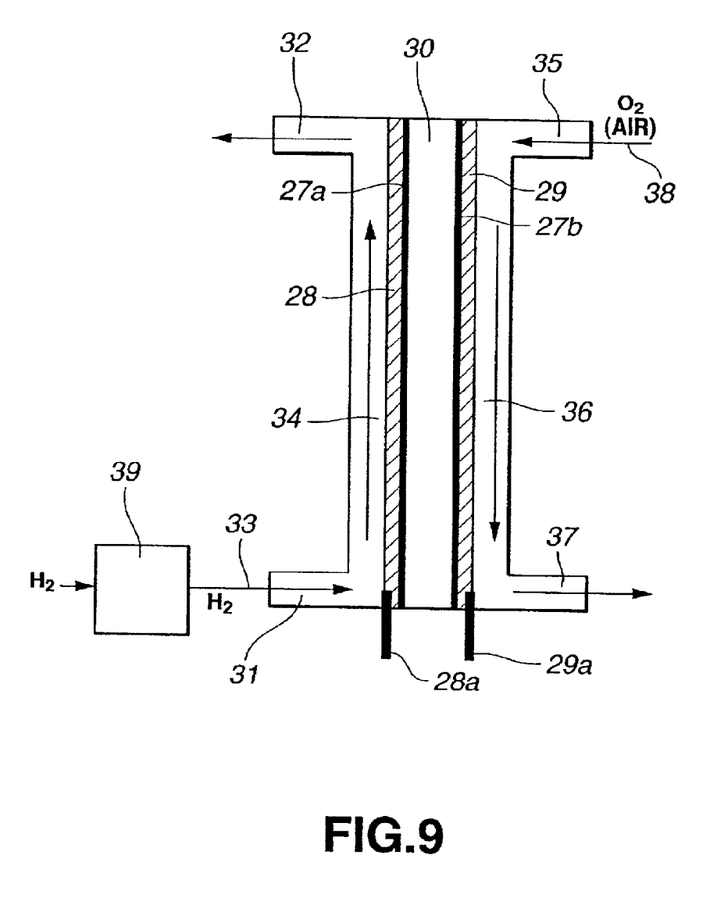
FIG. 9 is a schematic view showing a fuel cell according to an embodiment of the present invention.

FIG. 9 shows an embodiment of the present invention of a fuel cell having the aforementioned electrodes and proton conductor therein.

As shown in FIG. 9, the fuel cell includes a negative electrode (fuel electrode or hydrogen electrode) 28 and a positive electrode (oxygen electrode) 29, having catalysts with, for example, a metal component 27a and 27b intimately bonded thereto or scattered therein, and a proton conductor unit 30 disposed between the electrodes. From the negative electrode 28 and the positive electrode 29 are derived terminals 28a, 29a for connection to external circuitry.

In this fuel cell, according to an embodiment of the present invention, hydrogen is supplied in use via an inlet 31 on the side of the negative electrode 28 so as to discharge via an outlet 32, which may optionally be omitted. As the fuel (e.g., $H_2$) traverses a channel 34, protons are generated and migrated along with protons generated in the proton conductor unit 30 towards the positive electrode 29 where they are reacted with oxygen (air) 38 supplied via an inlet 35 to the channel 36 to flow towards the outlet 37 to recover a desired electromotive force.

In the above-described arrangement, a hydrogen occlusive alloy or a carbonaceous material for hydrogen occlusion is stored in a hydrogen supply source 39 as a source material for supplying hydrogen. This material may also have hydrogen occluded at the outset and so as to be accommodated in this state in the hydrogen supply source 39.

The present invention is further explained, but not limited by, reference to an Example and a Comparative Example.

EXAMPLE 1

Fullerene ($C_{60}$ and/or $C_{70}$) in a sulfonated form is deposited on an electrode mainly composed of a carbon material, as shown in FIG. 2. Since this deposited material is dissolved or dispersed in alcohol or THF, a 1M solution thereof was applied dropwise so that the deposited material will amount to 1 wt % based on the electrode weight. Dripping was conducting with a filter. The solvent was sufficiently dried in a dry atmosphere to measure output characteristics under a condition that a dry hydrogen gas was circulated by a fuel electrode and dry air was circulated by an oxygen electrode. An output change was measured in relation to the time elapsed.

COMPARATIVE EXAMPLE 1

Figure 10:
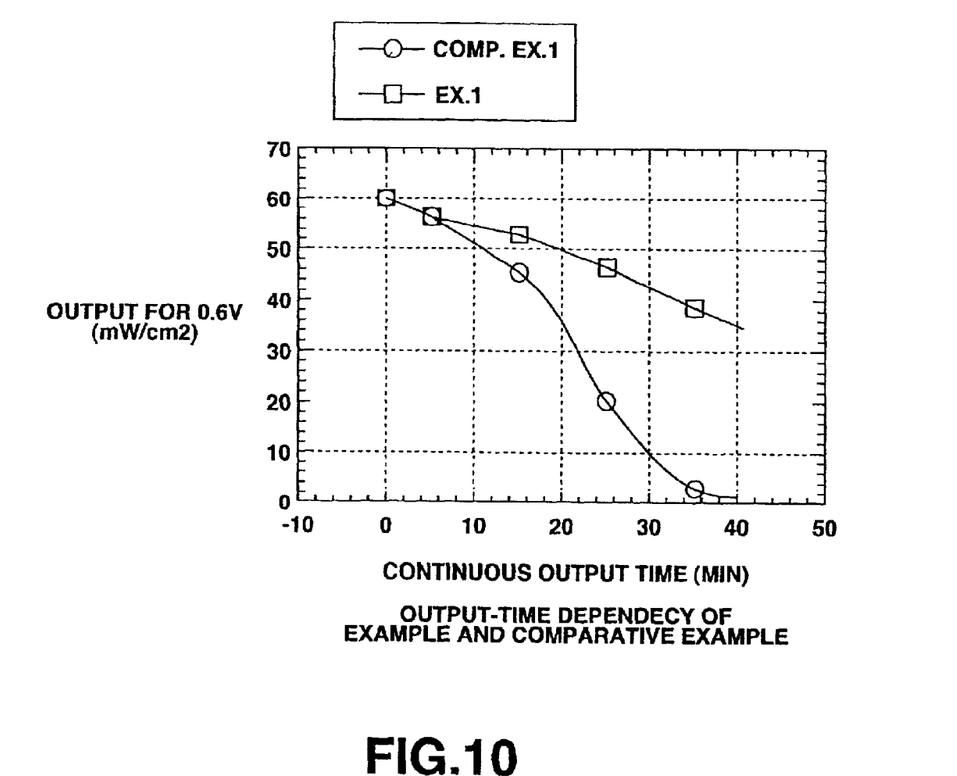
FIG. 10 is a graphical representation showing output-time dependency of the example and comparative example according to an embodiment of the present invention.

A high molecular weight solid electrolyte was added at the same weight ratio to the electrode used Example 1. Output evaluation was also carried out under the same condition as in Example 1. FIG. 10 shows output-time dependency of the example and comparative example.

Although the present invention has been described with reference to specific embodiments, those of skill in the art will recognize that changes may be made thereto without departing from the spirit and scope of the invention as set forth in the hereafter appended claims.

What is claimed is:

1. A method of producing a fuel cell, the method comprising the steps of:
   providing a first electrode, a second electrode, and a proton conduct layer disposed between the first electrode and the second electrode;
   providing a carbonaceous material;
   mixing the carbonaceous material having a surface with a solvent comprising a proton conductor material;
   coating the surface of the carbonaceous material with the proton conductor material; and
   forming at least one of the first electrode and the second electrode with the carbonaceous material.

2. The method as claimed in claim 1, wherein the proton conductor material comprises a material substantially composed of carbon-based material that forms a matrix structure and at least one type of a proton dissociative group that is attached to the matrix structure.

3. The method as claimed in claim 2, wherein the carbon-based material is selected from the group consisting of carbon clusters, fullerenes, fullerenes in a sulfonated form, carbon nanotubes including carbon nanotubes in a sulfonated form and mixtures thereof.

4. The method as claimed in claim 1, wherein the carbonaceous material comprises a carbonaceous material composed of carbon fibers.

5. The method as claimed in claim 4, wherein the carbonaceous material is selected from the group consisting of at least one type of a carbon nanotube, a graphite fibrous material including a vapor-grown carbon fiber and mixtures thereof.

6. A gas diffusion electrode operable within a fuel cell comprising a carbonaceous material having a surface and a proton conductor material that is applied to at least a portion of the surface, wherein the proton conductor material is composed of a carbon-based material forming a matrix structure that has at least one proton dissociative group introduced to the matrix structure, wherein the gas diffusion electrode comprises a thickness of about 10 $\mu$m or less.

7. A gas diffusion electrode operable within a fuel cell comprising a carbonaceous material having a surface and a proton conductor material that is applied to at least a portion of the surface, wherein the proton conductor material is composed of a carbon-based material forming a matrix structure that has at least one proton dissociative group introduced to the matrix structure, wherein the gas diffusion electrode comprises a catalyst having a metal component which is applied to at least a portion of the surface of the carbonaceous material.

8. A fuel cell comprising:
   a first electrode, a second electrode and a proton conductor layer disposed between the first electrode and the second electrode, wherein at least one of the first electrode and the second electrode comprises a carbonaceous material having a surface and a proton conductor material that is applied to at least a portion of the surface, wherein the first electrod and the second electrode each comprise a thickness of about 10 $\mu$m or less.

9. A fuel cell comprising:
   a first electrode, a second electrode and a proton conductor layer disposed between the first electrode and the second electrode, wherein at least one of the first electrode and the second electrode comprises a carbonaceous material having a surface and a proton conductor material that is applied to at least a portion of the surface, wherein the first electrode and the second electrode each comprise a catalyst having a metal component which is applied to at least a portion of the surface of the carbonaceous material.

10. A fuel cell comprising:
    a first electrode, a second electrode and a proton conductor layer disposed between the first electrode and the second electrode, wherein the first electrode and the second electrode each comprise a fibrous carbonaceous material and a proton conductor material that is applied to at least a portion of the fibrous carbonaceous material, wherein the first electrode and the second electrode each comprise a thickness of about 10 $\mu$m or less.

11. A fuel cell comprising:
    a first electrode, a second electrode and a proton conductor layer disposed between the first electrode and the second electrode, wherein the first electrode and the second electrode each comprise a fibrous carbonaceous material and a proton conductor material that is applied to at least a portion of the fibrous carbonaceous material, wherein the first electrode and the second electrode each comprise a catalyst having a metal component which is applied to at least a portion of the fibrous carbonaceous material.

* * * * *